March 15, 1966  F. E. MORRIS  3,240,995
DYNAMIC REGISTRATION DEVICE
Filed May 14, 1962
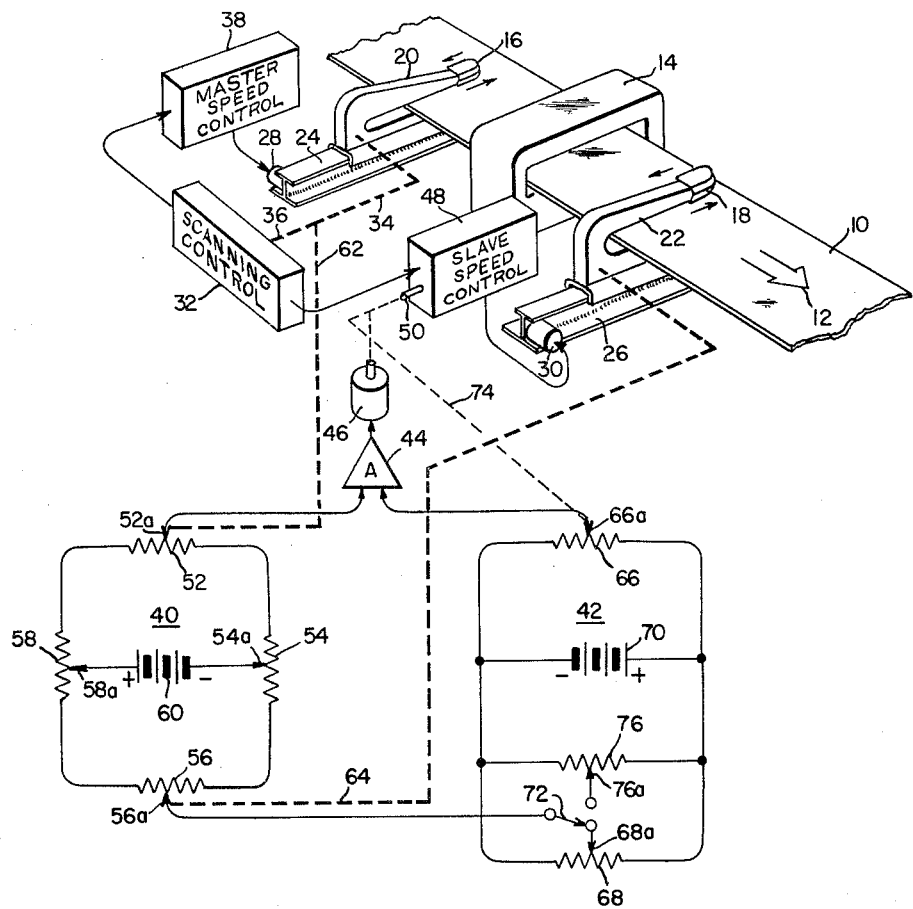
Inventor
Frank E. Morris
by Anthony D. Cennamo
Attorney

United States Patent Office

3,240,995
Patented Mar. 15, 1966

3,240,995
DYNAMIC REGISTRATION DEVICE
Frank E. Morris, Columbus, Ohio, assignor to Industrial Nucleonics Corporation, a corporation of Ohio
Filed May 14, 1962, Ser. No. 194,300
9 Claims. (Cl. 317—6)

This invention relates to systems comprising a plurality of traversing gauges for measuring traveling sheet material, and more particularly it relates to novel servo-coupling means for maintaining two or more gauging heads in lateral registration while traversing the width of the sheet.

The invention is particularly useful in controlling an industrial process wherein a sheet material product is formed in serial stages, for example, by coating, laminating or impregnating a base sheet. In such a process the sheet is commonly measured by one gauge before the coating or impregnant is applied, and by another gauge thereafter. The continuous readings of the two gauges are then compared, say, by a suitable analog computer which renders an indication of the coating weight as the difference between the two gauge readings.

Similarly computers are commonly used to indicate the ratio of the weight per unit area of the product sheet to the weight per unit area of the impregnant contained therein. In the latter case, the computer output may be in turn utilized by a suitable automatic control device for the impregnating machine in order to keep the said ratio constant in spite of variations in the weight per unit area of the base sheet.

However, due to the fact that the weight per unit area of the sheet varies from place to place across the width thereof, a computation such as that described may be invalid unless the measurement of the base sheet plus the coating or impregnant is taken directly downstream from the corresponding measurement of the base sheet alone. This condition is satisfied by maintaining what is termed herein as "registration" of the lateral position of the two or more gauging heads.

Where the gauging heads can be allowed to remain stationary during measurement, registration is effected very simply by locating the heads on a common line parallel to the edges of the traveling sheet. However, best results are ordinarily obtained from a scanning-type measurement wherein the readings are taken while the gauges continually traverse back and forth across the width of the sheet. In this case the term registration is taken to include what may be called "dynamic registration," meaning that the two gauges traverse the sheet at substantially identical rates of speed while the heads are either directly in line as aforesaid or offset by a certain spacing with the upstream gauge leading the downstream gauge by a sufficient distance to take care of the transportation delay during which a point on the sheet travels from the location of the upstream gauge to the position of the downstream gauge.

In order to maintain dynamic registration it has been proposed to interconnect the traversing drive systems mechanically, but this is unwieldy in the industrial plant environment. Systems have been interconnected with a synchro-tie such as a Selsyn coupling, but the large Selsyn devices adapted to transmit the required torque are quite expensive. Both of the foregoing proposals make it difficult and expensive to provide means for individually positioning or traversing the gauges. A position comparator bridge and polarized relay system comprising an adaptation of a device described in Patent No. 2,829,268 has also been used, but the combination of continuous duty and the normal chattering of the polarized relay contacts in the phugoid condition when the bridge is in the region of a null constitutes extremely severe service for the polarized relay and other components of the system.

In accordance with this invention, one of the plurality of gauges aforesaid is designated the master gauge and includes a conventional scanning drive control whereby the gauging head is programmed to traverse back and forth across the width of the sheet in a repeating sequence. The additional gauge (one or more), designated the slave gauge, may have its start, stop and reverse control functions initiated by the master scanning control in a manner now well known to those skilled in the art. The present invention is characterized as an automatically variable speed control system for the slave gauge traversing drive mechanism whereby the slave gauging head is maintained in dynamic registration with the master gauging head.

To this end, in general I provide means for generating a first analog signal representing the degree of departure from registration of the slave gauge head with the master gauge head, means for generating a second analog signal representing the traversing speed deviation of the slave from the selected nominal traversing speed of the master, and a servomechanism responsive to the combination of the two signals for automatically adjusting the traversing speed of the slave.

Accordingly it is the object of this invention to provide an improved system for automatically maintaining a plurality of traversing gauges in dynamic registration.

It is a more specific object to provide such a system which does not suffer from the disadvantages of prior devices as above enumerated.

Further objects and advantages will become apparent in the following detailed description of one illustrative embodiment of the invention, taken in conjunction with the appended drawing, in which:

The single figure is a sketch, partly in perspective and partly in schematic, of a pair of traversing gauges measuring a traveling sheet in combination with a dynamic registration device in accordance with one preferred embodiment of the invention.

Referring now to the drawing, there is shown a traveling sheet 10 proceeding in the direction of the arrow 12 and passing through a processing stage represented as a machine 14, wherein it may be assumed that a coating is applied to the sheet.

A pair of gauging heads 16 and 18 are respectively located upstream and downstream of the coating machine for measuring the sheet before and after the coating is applied. The heads 16 and 18 are mounted on brackets 20 and 22, supported for rectilinear movement on rails 24 and 26 which permit traversing the heads 16 and 18 laterally back and forth across the width of the sheet.

Mechanical power for traversing the gauges is independently supplied by variable-speed reversible motors 28 and 30 constituting part of a well-known drive arrangement. The start, stop and reversing functions of the motor control arrangement are performed by a conventional and well-known scanning control device, represented as a box 32, which is responsive to the position of the master gauge traversing bracket 20, as is indicated by the connection of the dotted line 34. Conventionally, the scanning control device 32 receives an electrical analog signal (representing the position of the gauging head 16), from a potentiometer (not shown) which is geared to the traversing drive system, and actuates relays (not shown) for stopping and reversing both motors when said signal indicates that the gauging head has reached a selected point near the edge of the sheet.

The speed of the master traversing motor 28 is conventionally set by a speed control device represented by box 38. Ordinarily this device comprises a manually adjustable speed control rheostat, generally in combination with a two-speed switching arrangement which is automatically controlled by the scanning control 32, whereby the master gauge is driven at high speed across the sheet in one direction and at a slow scanning speed in the reverse direction.

It is understood that the elements set forth in the foregoing description constitute conventional and well-known elements of the present combination.

In order to maintain dynamic registration of gauging heads 16 and 18 in accordance with the invention, a position comparator bridge circuit 40, a speed comparator bridge 42, a servo amplifier 44 and servo-motor 46 combination constitutes means for automatically resetting the speed control device, represented as a box 48, for the slave gauge traversing motor 30. The slave speed control 48 may be of any known type, such as a speed rheostat, having an adjustable control shaft 50 whose angular position determines the motor speed.

Bridge circuit 40 comprises a series-connected loop of four potentiometers 52–58 energized by a battery 60 or other voltage source connected across the adjustable taps of potentiometers 54 and 58. The adjustable taps 52a and 56a of potentiometers 52 and 56 are mechanically driven through mechanical connections indicated by the dotted lines 62 and 64 to the respective traversing brackets 20 and 22.

Bridge circuit 42 basically comprises a pair of potentiometers 66 and 68 energized by connection across a battery 70 or other voltage source.

It is seen that the two bridge circuits 40 and 42 are connected in series across the input terminals of the servo amplifier 44. This circuit is traced from the driven tap 52a of potentiometer 52, connected to one amplifier terminal, through bridge 40 to the driven tap 56a of potentiometer 56, thence through a switch 72 to the adjustable tap 68a of potentiometer 68, through bridge circuit 42 to the movable tap 66a of potentiometer 66 which is connected to the other amplifier input terminal.

The output of amplifier 44 drives the servo motor 46 in one direction or the other depending on the polarity of the voltage across the amplifier input. The motor in turn mechanically drives the speed regulator shaft 50 of the slave speed control box 48. Motor 46 also drives the movable tap 66a of potentiometer 66 in the bridge circuit 42 through a mechanical connection indicated by the dotted line 74. Accordingly for any given setting of the slave speed regulator shaft 50, the potentiometer tap 66a occupies a corresponding position.

Initially the tracking potentiometers 54 and 58 are adjusted to correct any electrical mismatching of the potentiometers 52 and 56 and/or any misalignment in the mechanical hook-up thereof with the traversing drive mechanism. With the proper adjustment made, the voltage output of bridge 40, constituting the potential difference between taps 52a and 56a, is zero when the heads 16 and 18 are in registration anywhere across the width of the sheet 10.

The motor speed control 38 is set manually so that the head 16 traverses at the proper speed to suit individual installation requirements. Obviously there is a certain position of the slave speed control shaft 50 which will cause the slave head 18 to traverse at approximately the same speed as the master head 16. This position produces a corresponding setting of the mechanically coupled potentiometer tap 66a, whereby a discrete potential appears thereon. The potentiometer 68 is manually adjusted so that this same potential appears on the tap 68a.

It is now apparent that the driven tap 52a of potentiometer 52 provides a potential constituting an electrical analog of the position of head 16, that potentiometer tap 56a similarly provides an analog of the position of head 18 and that the output of the bridge circuit 40 provides an analog voltage indicating the deviation of the slave head 18 from proper registration with the master head 16. Similarly the potentiometer tap 68a provides a potential constituting an analog of the selected nominal traversing speed of the slave head 18 which has been made equal to the selected nominal traversing speed of the master head 16; the potentiometer tap 66a provides an analog of the actual traversing speed of the slave head 18 insofar as it can be correlated with the position of the slave speed regulator shaft 50, and hence the output of the bridge circuit 42 provides an analog voltage indicating the deviation in the traversing speed of head 18 from the nominal traversing speed of head 16. In the illustrated apparatus, both bridge circuits 40 and 42 provide D.C. voltages whose polarity indicates the direction of the respective deviation and whose amplitude indicates the amount thereof.

In normal scanning operation, so long as the two heads 16 and 18 are in registration, the registration control device remains quiescent, with both bridge circuits in balance and servo motor 46 at a standstill. However, if either traversing mechanism speeds up or is delayed from any cause tending to produce a departure from registration of heads 16 and 18, such departure results in an error voltage output from bridge 40 which appears across the input of servo amplifier 44, whereupon the output of the amplifier applied to servo motor 46 causes the latter to operate, rotating the speed regulator shaft 50 in a direction to speed up or slow down the slave traversing motor as required to correct the error in registration. The servo motor 46 operation is relatively rapid, and continues until the potentiometer tap 66a has been driven to a point where the voltage output of bridge 42 is equal and opposite to the registration error voltage from bridge 40. At this time the input to the servo amplifier becomes zero and the servo motor 46 stops.

With the speed correction made to the slave traversing drive, the departure from registration is reduced, as is the voltage output of bridge circuit 40. As the output of bridge 40 then becomes less than the output of bridge 42, the difference voltage appearing at the input of amplifier 49 is reversed. This causes the servo motor to operate in the reverse direction.

It is apparent from the foregoing that the servo-coupling mechanism is effective to constantly maintain a correction to the nominal traversing speed of the slave head 18, said correction being directly proportional to the departure of said head from registration with the master head 16.

It has been noted that it is common practice to have the gauges scan at a slow speed in one direction and a fast speed in the other. Accordingly there is shown an additional potentiometer 76 in the bridge 42 which is adapted to perform the same functions as potentiometer 68, except that it is set as described hereinabove to balance bridge 42 with a fast speed setting of the regulator shaft 50. The switch 72 enables instantaneous selection of slow or fast speeds, and where the two-speed scanning is used this switch comprises a set of relay contacts in the scanning control box 32 whereby the switching is performed automatically.

While only one specific apparatus is described herein, such apparatus and description is meant to be illustrative only and not restrictive, since obviously many changes and modifications can be made within the scope of the invention as set forth in the appended claims.

What is claimed is:

1. Sheet measuring apparatus comprising a master gauge and a slave gauge spaced along the length of said sheet, means causing said gauges to traverse back and forth across the width of said sheet including drive means for traversing said master gauge at a nominal speed and means for adjusting the traversing speed of said slave gauge, means for generating an analog signal indicating any departure from registration of said gauges, means for generating an analog signal indicating any departure of the traversing speed of said slave gauge from said nominal speed, and means responsive to the combination of said signals for actuating said speed adjusting means to maintain dynamic registration.

2. Apparatus as in claim 1 wherein said signal combination responsive means comprises a servomechanism for automatically maintaining a constant ratio of said signals, whereby a correction applied to said speed adjusting means is proportional to the degree of said departure from dynamic registration, said adjusting means being driven by said servomechanism.

3. Sheet measuring apparatus comprising a master gauge and a slave gauge spaced along the length of said sheet, means causing said gauges to traverse back and forth across the width of said sheet including drive means for traversing said master gauge at a nominal speed and means for adjusting the traversing speed of said slave gauge, a first potentiometer having a movable tap mechanically driven by said master traversing gauge, a second potentiometer having a movable tap mechanically driven by said slave traversing gauge, means connecting said potentiometers in a bridge circuit for providing an error voltage output indicating the magnitude and direction of any departure of said slave gauge from registration with said master gauge, a third potentiometer having a movable tap mechanically driven to a position in accordance with the setting of said slave gauge speed adjusting means, a fourth potentiometer having a movable tap for selecting a predetermined setting of said speed adjusting means, means connecting said third and fourth potentiometers in a bridge circuit for providing a speed deviation voltage indicating the magnitude and direction of the departure of said slave speed adjusting means from said predetermined setting, a servo motor for actuating said slave speed adjusting means and a servo amplifier responsive to the difference between said error voltage and said speed deviation voltage for energizing said motor in a direction to reduce said difference to zero, whereby the traversing speed of said slave gauge is altered so as to correct said departure from dynamic registration.

4. A control system for a multiple scanning gauge system wherein the signals from said gauges are utilized to determine a material characteristic, comprising, a master gauge and at least one slave gauge, means for separately moving said gauges across a material to be measured, means responsive to the registration of said gauges and to the difference in speed to control the speed of said slave gauge to maintain dynamic registration of said gauges.

5. A control system, as defined in claim 4, wherein said responsive means provides a first signal that is a function of the registration of said gauges and the direction, whether said slave gauge is ahead or behind said master gauge, and a second signal that is a function of the difference in speed and the direction, whether said slave gauge is slower or faster than said master gauge, and combines said first and second signals so that a change in dynamic registration produces a corresponding change in slave gauge speed to return said slave gauge to dynamic registration, said change being limited by said second signal, and subsequent closing of said slave gauge toward dynamic registration reduces the previous change in slave gauge speed until said gauges are returned to dynamic registration.

6. A control system for a multiple scanning gauge system to maintain dynamic registration of the gauges, comprising, a master gauge position to move across one dimension of a material to be measured, means for traversing said master gauge across said material, at least one slave gauge spaced from said master gauge to move across said material dimension, means for traversing said slave gauge across said material dimension, means responsive to the registration of said gauges and to the change in speed of said slave gauge to adjust said slave gauge traversing means to maintain dynamic registration of said gauges.

7. A control system for a multiple scanning gauge system wherein the signals from said gauges are utilized to determine a material characteristic, comprising, a master gauge and at least one slave gauge, means for controlling the scanning speed of said slave gauge, means for controlling the scanning speed of said master gauge, a first balancing network comprising first means having a condition variable with the position of said master gauge, second means having a condition variable with the position of said slave gauge, third means for comparing the variable condition of said first and second means to obtain a first signal that is a function of the registration of said maser and slave gauges, fourth means having a condition variable with the speed of said slave gauge from a reference speed to produce a second signal that is a function of a change in speed of said slave gauge, means for changing the speed of said slave gauge and for varying the variable condition of said fourth means for changing said second signal to continuously balance said first signal.

8. A control system, as described in claim 7, wherein, said slave gauge speed changing means is a servomechanism coupling means having an input that receives said first and second signals, said first and second signals balancing out at said servomechanism input when said gauges are in registration, a change from dynamic registration producing an error signal at said input that changes said slave gauge speed to restore dynamic registration and the change in slave gauge speed changes said second signal to balance out said first signal, and as said slave gauge moves toward dynamic registration, said first signal changes, driving said servomechanism coupling means to change said second signal, balancing out said first signal, and reducing the slave gauge speed change until dynamic registration is reached again.

9. A control system for a multiple scanning gauge system wherein the signals from said gauges are utilized to determine a material characteristic, comprising, a master gauge and at least one slave gauge, means for separately moving said gauges across a material to be measured, means for controlling the scanning speed of said master gauge, means for controlling the scanning speed of said slave gauge, a signal processor for producing a first signal that is the result of the combination of second and third signals, said second signal being a function of the registration of said gauges and said third signal being a function of the change in speed of said slave gauge from a reference speed, means for receiving said first signal to vary said slave speed control means, said signal processor means combining said second and third signals so that said first signal, which adjusts said slave control means, changes said slave gauge speed in the direction to restore dynamic registration and the corresponding change in said third signal reduces said first signal, and, as said gauges are brought closer into dynamic registration, said second signal changes said first signal to change the speed of said slave gauge in the opposite direction, relative to increase and decrease, from the initial change to bring said gauges into dynamic registration.

(References on following page)

References Cited by the Examiner

UNITED STATES PATENTS

| | | | |
|---|---|---|---|
| 2,930,958 | 3/1960 | Schaufuss | 318—77 |
| 2,971,144 | 2/1961 | Vogel | 318—382 |
| 3,007,052 | 10/1961 | Hickman et al. | 250—83.3 |
| 3,064,173 | 11/1962 | Breen et al. | 318—329 |
| 3,108,844 | 10/1963 | Alexander et al. | 346—46 |

References Cited by the Applicant

UNITED STATES PATENTS 3,015,129  1/1962  Hays et al.

OTHER REFERENCES

"Computers Team with Nuclear Gauges to Control a Paper Saturation Process," Control Engineering, vol. 2, 1955, pages 76 and 77.

SAMUEL BERNSTEIN, *Primary Examiner.*

MAX LEVY, *Examiner.*